United States Patent [19]

Chadwick

[11] Patent Number: 5,794,550
[45] Date of Patent: Aug. 18, 1998

[54] IMPLANTATION OF A FIXED WATER/ NUTRIENT GEL

[76] Inventor: Galen John Chadwick, 105 Apricot La., Los Gatos, Calif. 95030

[21] Appl. No.: 719,147

[22] Filed: Sep. 24, 1996

[51] Int. Cl.⁶ .............................. A01C 21/00; A01H 1/00
[52] U.S. Cl. ........................... 111/200; 47/57.6; 47/58
[58] Field of Search .................. 47/57.6, 58, DIG. 9, 47/1.01; 111/52, 101, 102, 106, 200

[56] References Cited

U.S. PATENT DOCUMENTS

| | | | |
|---|---|---|---|
| 3,322,080 | 5/1967 | Gatzeke et al. | 111/1 |
| 3,648,631 | 3/1972 | Fiedler et al. | 111/6 |
| 3,815,525 | 6/1974 | Kainson et al. | 111/6 |
| 4,265,185 | 5/1981 | Skipper | 111/1 |
| 4,385,468 | 5/1983 | Yoshiaki | 47/14 |
| 4,703,868 | 11/1987 | Shaw | 221/211 |
| 4,779,376 | 10/1988 | Redenbaugh | 47/57.6 |
| 4,780,987 | 11/1988 | Nelsen et al. | 47/57.6 |
| 4,881,344 | 11/1989 | Frey et al. | 47/77 |
| 4,907,516 | 3/1990 | Rogers | 111/127 |
| 5,010,685 | 4/1991 | Sakamoto et al. | 47/57.6 |
| 5,207,168 | 5/1993 | Comer | 111/200 |
| 5,226,255 | 7/1993 | Robertson | 47/56 |
| 5,394,812 | 3/1995 | Dunning et al. | 111/127 |
| 5,427,593 | 6/1995 | Carlson et al. | 47/57.6 |

OTHER PUBLICATIONS

Discover, Mar. 1995, Plants Relax and Expand

*Primary Examiner*—Michael J. Carone
*Assistant Examiner*—Robert Pezzuto
*Attorney, Agent, or Firm*—Sheldon H. Parker

[57] ABSTRACT

The invention isolates a water laden nutrient gel around, or accessible to, an individual seed sufficient to provide for a known quantity of growth. The seed is first encased in a gel being an elongated plug reaching directly to the moisture horizon with or with a surface pool consistent with the specific root pattern requirements of the seed. The gel and seed combination is placed into the ground with a portion of the gel being proximate the moisture horizon to form an artificial root system. As the seed germinates to form a plant, the roots of the plant extend along the artificial pathway formed by the gel to the moisture horizon. The gel consists of water and nutrients required by the seed to grow. The gel can contain a hydrophillic material, to draw water from the moisture horizon along the gel to the root. The gel can contain micro-tubular capillaries to wick water from the moisture horizon to the developing plant root.

13 Claims, 3 Drawing Sheets

IMPLANTATION OF A FIXED WATER/NUTRIENT GEL

BACKGROUND OF THE INVENTION

1. Field of the Invention

The instant invention discloses the encasement of seeds in a time-release medium whereby water and nutrients are delivered to a germinating plant on an as-needed basis. In one embodiment, the gel and seed is injected into the soil directly, by means of a mechanical or fluid drill designed for the purpose. In another embodiment, the gel and seed are contained in tubes which are then planted with machinery specifically designed for the purpose. In a third embodiment, the tubes are constructed for dropping from the air, with spiral veins affixed, to promote burrowing into sand and soft earth by prevailing wind action.

2. Brief Description of the Prior Art

For millennia, broad scale agriculture has relied on natural rainfall, and wholesale application of nutrients for plant growth. In areas of periodic rainfall, planting must be timed to take advantage of wet season rains. In semi-arid or desert regions, irrigation is used to flood crops to promote plant survival and growth. All methods require enormous quantities of water, far beyond the actual amount used by the roots of the plant. Drip-irrigation methods involve the physical pumping of water/nutrients through a system that is expensive to put in and maintain. Typically, drip-irrigation is best suited for one on one application to large stable plants that bear fruit or nuts season after season. Broadcast crops such as wheat, millet, barley, sorghum, etc. do not lend themselves this application because they are sown in a tillage situation by the millions of seeds and essentially cover the acreage sown.

The problem of seed germination in large farms has been addressed in many patents and publications. U.S. Pat. No. 4,881,344 discloses a novel sleeve which is filled with a substrate of peat, humus, sawdust, etc., commonly used in agriculture. The sleeve is manufactured from a nonwoven fabric or paper, cut into strips and filled with the substrate. The resulting tube is then glued with a dispersion adhesive at 350° and cut into cartridges of the appropriate length. The cartridges are then placed in flats and planted.

U.S. Pat. No. 4,385,468 discloses a process and appliance for the cultivation of grains which are germinated by soaking in water. The invention is used to easily germinate these grains in a home use situation.

A March 1995 article in Discover Magazine discusses the isolation of a protein which has been named Expansion. The naturally protein allows the expansion of the cellular walls by attacking the bonds which maintain the wall's cellulose fibers.

U.S. Pat. No. 4,703,868, among others, provides for the selection of individual seeds from a suspension containing multiple seeds. The '868 patent transfers the seeds to a separate stream of fluid, and then conveys the fluid and seed combination to a planting machine. Many patents, such as U.S. Pat. Nos. 4,265,185, 3,648,631 and 3,322,080 have been issued where the seeds, either alone or in a carrier, are deposited into a furrow.

Technology development has allowed for slugs of gel or liquid to be injected into the ground through the use of pressure. U.S. Pat. No. 4,907,516 show a tractor that injects fertilizer and other liquid crop treatments into the ground by directly injection jets with a nozzle. A solenoid controlled valve generates short pulses of fluid that penetrate 2 to 4 inches into the ground.

U.S. Pat. No. 5,394,812 discloses a device which injects a polymer into the solid in a substantially uniform pattern. The invention relies on the resistance of the soil to fan out the fluid thereby providing even coverage of the polymer below the soil surface.

U.S. Pat. No. 5,207,168 is an apparatus used to treat the soil surface and reduce soil density. The pressure of the liquid is controlled to allow the liquid to disperse laterally within the soil. The nozzles are placed in a proximity which allows for the laterally dispersed liquid from one nozzle to come in contact with the dispersed liquid from an adjacent nozzle. In this manner, the liquid to be disbursed is evenly distributed through out.

U.S. Pat. No. 3,815,525 discloses an apparatus for introducing a liquid into the root zone of plants. The liquid can be injected to a depth between 30 cm and 1 meter, dependent upon the type of plant.

None of the foregoing patent and documents address the issue of broad acre planting in dry areas. None of the foregoing are concerned with sustaining and germinating a seed within its environment, but rather are concerned with providing additional nutrition for the seed or plant. Thus, in areas where rain comes late in the season, seeds cannot germinate and grow until the first rain. The instant invention has overcome the foregoing problem by incorporating the seed in a gel which provides sufficient water and nutrients for germination on demand. The gel is structured with chemical and capillary features to provide a wicking mechanism that, when placed a sufficient distance into the ground, allow for the roots of the seed to tap into the subsurface moisture horizon.

SUMMARY OF THE INVENTION

The invention isolates a water laden nutrient gel around, or accessible to, an individual seed sufficient to provide for a known quantity of growth. The gel is preferably implanted vertically into the soil medium with the seed embedded at the upper-most end, near ground level. The gel delivers to the seed the equivalent of 2", 6" or more of rain, depending on the quantity of gel used in the encapsulation and the amount of available sub-surface moisture.

To grow the seed the seed is first encased in a gel. The gel is an elongated plug reaching directly to the moisture horizon, with or without a pool of gel having a shape consistent with the specific root pattern requirements of the seed. The gel and seed combination is placed into the ground with a portion of said gel being proximate the moisture horizon. In some instances, the seed can be treated to rapidly germinate. As the seed germinates to form a plant, the roots of the plant extend along the gel to the moisture horizon. The root growth maintains its relationship with the moisture horizon, forming an artificial pathway for root growth. The gel is injected into the ground under pressure in a predetermined pulse rate with the seed, encased within gel, is placed proximate the ground surface.

The gel consists of water and nutrients required by the seed to grow and can contain a hydrophillic material to draw water from the moisture horizon along the gel to the root. In one embodiment the gel contains a material which forms a skin along the exterior of the gel to isolate the gel from the exterior elements. The skin can be activated by either the chemical or the biological balance of the soil.

The gel can alternatively contain micro-tubular capillaries to wick water from the moisture horizon to the developing plant root. The micro-tubular capillaries are formed from naturally occurring substances placed, mixed or added to, the gel or artificially generated within the gel. In one embodiment the injector nozzle is provided with an inner delivery tube and an outer delivery tube with the inner delivery tube containing multiple openings at one end. The gels used within the inner tube and the outer tube are of compositions which do not mix with one another which allows for the formation of capillaries as the inner gel is forced through the multiple openings of the inner tube. In an alternate embodiment, the inner tube contains a non-gelatinous material which does not mix with the outer gel.

DETAILED DESCRIPTION OF THE DRAWINGS

The advantages of the instant disclosure will become more apparent when read with the specification and the drawings, wherein.

DETAILED DESCRIPTION OF THE INVENTION

Figure 1:
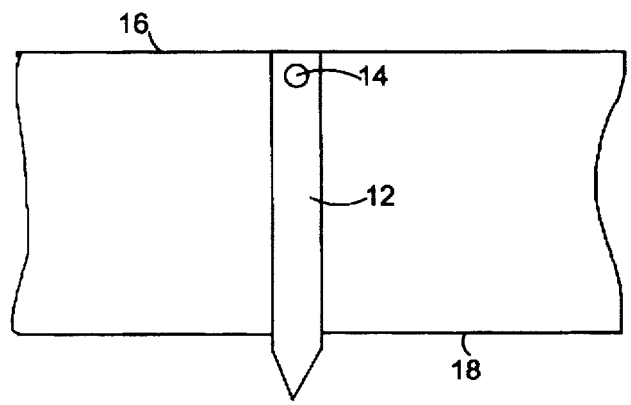
FIG. 1 is a cutaway view of one embodiment of a gel plug inserted into the ground and in contact with the moisture horizon.

The instant invention overcomes the problems associated with arid area and late rainfall, as well as other problems encountered with temporarily supplying seeds with sufficient water and nutrients. The foregoing problems are amplified when related to broad acre crops as heretofore there has been no practical method of supplying the necessary water to a vast quantity of plants, such as wheat. In the instant invention, the seeds are encapsulated within, or have access to, a nutrient gel which provides both the moisture and nutrition required to germinate the seed. The gel used herein can be any gel or gel like substance which can sustain plant life. The gel/seed combination is placed into the ground at a depth which allows the end of the gel zone to come in contact with, or penetrate, the moisture horizon. As used herein, the moisture horizon refers to the subsurface area at which sufficient moisture is present to sustain plant life. The gel provides a stable, nutrient laden, water supply to be used by the developing seed and embryonic plant while the roots are allowed to initiate development without the immediate addition of natural rainfall. Since the actual amount of water required by a seed to germinate and grow into a seedling is small, small amounts of the gel are required. Because the water is encapsulated within the gel, and provides direct access to the moisture horizon, a small plug can provide the root with access to water that fell as rain in the fall and winter months. Although the plug itself cannot economically provide the quantities of water required for plant growth, the access of the moisture horizon by the gel wicks the necessary water up to the root. As the root grows, the hydrophillic and capillary forming additives of the gel draw the water from the moisture horizon to be accessed by the root. Under natural conditions, the water is drawn away from the seed. With the instant invention the plant will have a rudimentary root system in place to take immediate advantage of the next rainfall. This efficiency of utilization would lessen the plants dependency on total rainfall by as much as four to six inches, particular in those crops that can now mature before the hottest, driest weeks of summer set in.

In the optimum embodiment, the gel would provide an artificial root system with sufficient moisture and nutrients to allow a plant to reach the moisture horizon either through the agency of the gel itself, or as augmented by additional hydrophillic and capillary forming wicking agents. By using known methods of pretreating the seeds to rapidly germinate, or even cause them to develop to the emergent stage, a seedling will be formed within a determined number of hours or days. A tap root or fibrous root structure sufficient to utilize the moisture horizon will develop following the artificial root created by the gel. Subsequent rainfall will be immediately available to efficiently expand these established proto-roots, rather than be mostly wasted on hard, ungerminated seeds. For some types of plants and locations, the amount of time saved might make it possible to generate two crops in a growing season instead of one. In other instances, the use of the embodied invention as an artificial root system would make possible the planting of crops in areas historically too dry to sustain a predictable yield. As stated heretofore, the amount of gel used to obtain these results is dependent upon the predicted rainfall and soil conditions. A further consideration is the type of plant; for example, jojoba, a desert shrub, would develop more rapidly, with less natural moisture, and require substantially less gel than a mangium from the Australian rain forest. A date palm seed or other dune-stabilizing pla or yards in length.

Although gels have been used in the prior art as a medium in which to plant seeds, this has generally been accomplished by streaming the seed impregnated gel along a furrow. Other patents have disclosed injecting nutritional gel into the ground to feed plants or aerate grass. This does not, however, solve the problem of growing germinated seeds without adequate moisture. Other gels described in the prior art are passive, serving as a combined carrier and temporary nutrition. Conversely, the gel in the instant invention is an active agent when placed at a sufficient depth to come in contact with the moisture horizon, providing not only self-contained moisture and nutrients, but also drawing water up to meet the roots. This placement allows the root to grow down to the moisture horizon to access the available water. The use of gel provides the moisture for the interim growth as well as eliminating the normal resistance provided by the soil. Thus, the root is given a moisture rich, resistance free path which allows the seed's energy to be directed toward growth. In a sense, the gel's hydrophillic and capillary wicking agents provides the seed with an artificial root upon which to rely until its own root system is established.

The gel used to encase the seed is composed of any of the plant sustaining substances known in the art. Seeds are activated to growth by a combination of various naturally occurring events. Temperature and amount of sun obviously play a large part in the growth cycle and in most situations must be left to nature. Other factors, however, such as moisture and the necessary nutrients can be artificially controlled. In the seed/gel combination disclosed, the seed is encapsulated within the gel and therefore reliant upon the contents and structure of the gel for growth and development. Because of this, the gel must provide the moisture, and in some cases texture and nutrients nutrients, normally supplied by the soil. The gel provides a further advantage by allowing for "soil correction" through the addition of nutrients to the gel.

In the instant invention, the growth rate of the seed within the gel can be regulated based on a control of the surrounding substances. Inhibition or stimulation of growth can be through either physical or chemical channels known in the art. The channel chosen for seed growth regulation within the gel is dependent upon the soil factors and will be apparent to those skilled in the art.

In extremely arid areas, the gel can be sealed from the soil through various methods. The most economical would be a self-sealing skin which would harden in response to external stimuli, i.e. air, pH or soil elements. By sealing the gel, moisture contained within the gel remains accessible to the seed rather than wicking into the surrounding soil. The self-sealing skin not only maintains the integrity of the gel, but prevents unwanted, outside weed seeds from sprouting, minimize the quantity of herbicides necessary.

The quantity of gel used for each seed would be dependent upon the type of plant, depth of the moisture horizon, time period before the expected rainfall in the area and the quantity of water required by that particular species. Seeds absorb water in three stages, initial period of rapid intake, a lag period of little intake and a embryonic growth stage of rapid intake. Since excessive water can be harmful, care must be taken in gel preparation to control the amount of water provided for each stage.

In more arid areas, it is advantageous to combine capillary forming micro-structures with a hydrophillic element in the gel to draw moisture up from the moisture horizon. The hydrophillic substance can be any of many natural substances currently on the market known as "super absorbents". The capillary agents can be made from the extracted natural hollow fibers of any number of substances. In addition, they can also be mechanically generated within the gel plug by entraining streams of liquids, gases or secondary gels with the desired structural characteristic. If used, the skin is preferably a selectively permeable membrane as found naturally in cells, allowing water in, while preventing the loss of nutrients. In nature, water moves through the cells within an organism by osmosis. This form of diffusion also is applicable in the gel, however this can be to the detriment of the seed. As the gel will provide its own water supply, diffusion will normally remove the water from the gel into the drier earth. Thus, it is important that, if utilized, the skin of the gel be not only selective, but "one way in its approach to water molecules.

In areas where the soil is heavily water laden during early spring, the gel can be used to moderate the seed's exposure to water. Thus, in areas where the seeds rot when planted in early spring, the gel is used to prevent excess water from reaching, and subsequently rotting, the seed.

In northern areas where the ground is frozen until mid to late spring the gel can be utilized to plant seeds prior to the ground fully thawing. The seed/gel combination would be placed in the soil prior to the top soil thawing thus saving days or weeks of surface drying time normally required to allow access of planting apparatus. In this mode of application, it is the time requirements of the crops growing season that is telescoped more than the water requirements. As the seed is placed on the top of the gel plug, it will be exposed to the sun and warmer soil conditions which allow the seed to grow. The gel, which extends to the moisture horizon, can contain substances which prevent the gel from freezing, allowing for the roots to become established, and survive. The will ensure the optimum use of the critically shortened growing season found in far northern and southern latitudes As the soil continues to thaw, further spreading the anti-freezing agents, the growth of the seedling will not be stopped by the frozen soil. The gel will further protect the seed from rotting in the thawing process.

As well known in the agricultural art, different plant species respond differently to different soil types. Many arid soils have a pH balance or surface salt content that hinders plant growth. Although the instant invention cannot eliminate this response, it can mitigate the response to some extent. Thus, plants which will grow in a certain soil, although the seeds will not germinate in that soil, can overcome the germination barrier through use of the gel. Once the plant has established a root which access the moisture horizon, the pH balance of the soil has less of an affect on the plant's ability to sustain growth.

FIG. 1 illustrates the gel plug 12 which has been placed into the ground at ground level 16 and extends to the moisture horizon 18. The seed 14 has been placed at the appropriate planting depth near the top of the gel plug 12 to allow the seedling to easily reach the sunlight. It is important that the gel plug 12 be at, or close to, the moisture horizon 18. By using the gel the seedling is provided the benefits of an early growth, allowing the seedling to be established prior to the growth of weeds. By providing a path to the moisture horizon, the seedling can tap into the moisture horizon and continue its growth after the water contained in the gel has been exhausted.

Self-sealing skin generated by ground pH, soil structure, chemical or biological agents, would allow the extrusion of the gel and seed combination directly into the soil. Because of the automated direct infusion, this method allows for rapid planting of large acreage. Various methods of insertion can be used and the methods disclosed below provide examples and should, in no way, limit the scope of the invention. In the preferred embodiment of all apparatus used for the insertion of the gel, a moisture sensor is utilized to determine the level of the moisture horizon. Any of the apparatus known in the art which can be combined with the equipment being used for insertion can be used. The moisture sensor measures the depth of the moisture horizon and adjusts the quantity of gel inserted accordingly. In this way, gel waste is minimized by only using the required amount of gel to reach the moisture horizon. Conversely, gel and seeds are not wasted by placing the gel at an insufficient depth to reach the horizon. Although the sensor need not monitor each time the gel is inserted into the soil, it is advised that the sensor monitor the soil with sufficient frequency to accurately reflect changing field conditions.

The method of insertion of the gel plug 12 into the ground is preferably implemented on for broad acre coverage. In order to cover large areas, the planting method must be highly automated using affordable machinery.

In extremely loose soils it may be advisable to have a compaction sled or floating shoe to provide firmness for the injected gel. In extremely dense ground a coulter may be drawn ahead of the gel injection apparatus to facilitate penetration or dispersion of the gel.

Figure 2:
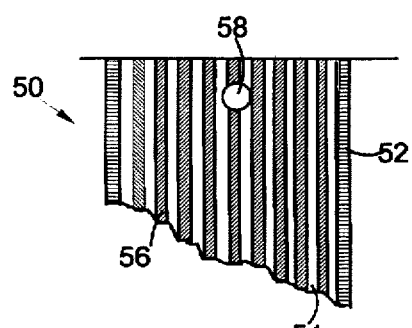
FIG. 2 illustrates an exploded, cutaway side view of another embodiment of the instant invention using an air generated self-sealing gel with an internal capillary zone.

The gel plug 50 illustrated in FIG. 2 utilizes capillaries 56 formed from a non-gelatinous substances such as plant material, or other hollow, biodegradable substance. The capillaries 56 are placed into the gel 54 to provide for rapid wicking from the moisture horizon to the seed 58. The caillaries 56 will wick water even if not perfectly geometrically oriented. Capillaries 56 which end prior to the seed 58 will wick water from whatever source available, whether it be the moisture horizon or adjacent water laden gel. The gel 54 has formed a skin 52 which prevents moisture from leaving the gel plug 50. Optimally, which is a hydrophillic, one way skin which increases the water content of the gel 54 and discussed in more detail herein.

Figure 3:
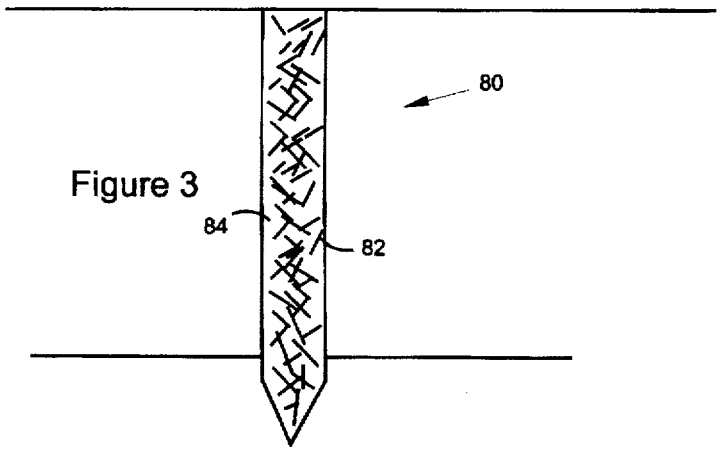
FIG. 3 illustrates a multi-directional capillary seed/gel plug inserted into the ground in contact with the subsurface moisture horizon.

The random capillaries 82 of gel plug 80, shown in FIG. 3, are mixed within the gel 84 in a random arrangement. The capillaries 82 are suspended within the gel 84 with some of the capillary 82 ends reaching the exterior of the gel 84. Where the capillaries come in contact with the exterior of the gel plug 80, they wick moisture from the surrounding soil. This design is optimal for use in extremely moist areas when combined with hydrophobic gels to prevent excessive water from rotting the seeds. When used with hydrophyllic gels, the capillaries 82 provide additional wicking capabilities by providing hydroscopic stasis. The gel 84 will only allow so much water to be brought in by the capillaries 82 prior to reaching saturation. Thus, the excessive water available within the soil can be moderated and tapped into as required by the roots.

Figure 4:
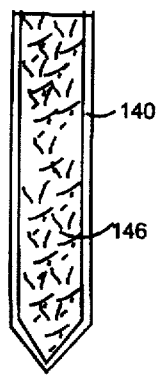
FIG. 4 is a side view of an example of a tine design to directly insert the gel of the instant invention.
Figure 5:
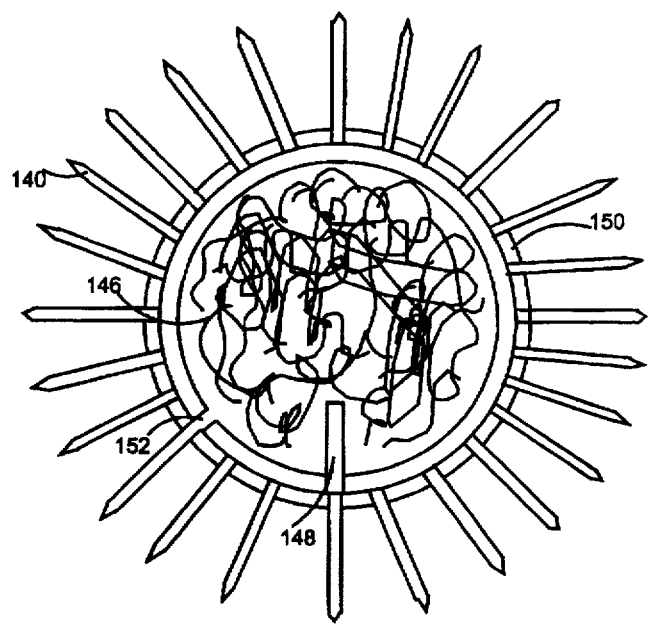
FIG. 5 is cut-away view of the tine drum of the instant invention.

In one method of insertion, illustrated in FIGS. 4 and 5, a unit having piston operated tines 140 contained in drum 150. The hollow tines 140 are filled with gel 146 at port 152 and revolve until they reach piston area 148. The tine 140 is inserted into the ground and then withdrawn, leaving the gel 146 in the soil. The gel 146 is prevented from being withdrawn along with the tine 140 by pulsed hydraulic or air pressure, or other means which would be applicable to the equipment being used to inject the gel. The end 44 of the tine 40 is allowed to open freely upon removal of the tine 140 to allow the gel 146 to be removed.

Figure 6:
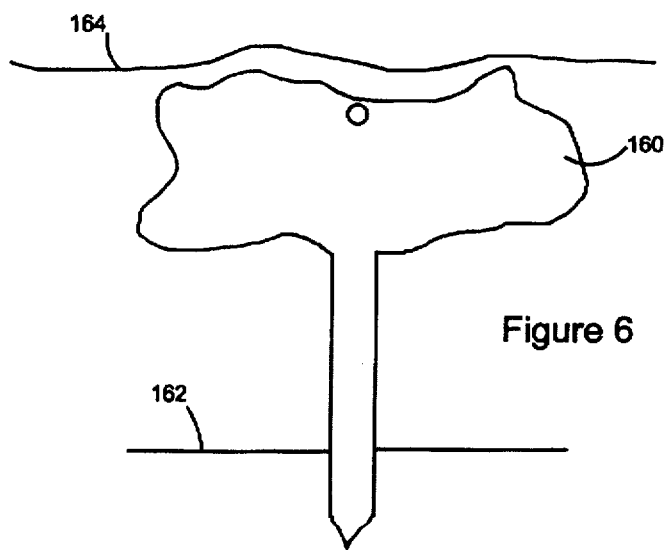
FIG. 6 is a cut-away side view of the gel formation used for fibrous root plants.

For fibrous root systems in addition to the plug reaching the moisture horizon, gel can be spread in the pre-tilled earth. This is illustrated in FIG. 6 wherein the gel 160 is ejected to the reach the moisture horizon 162 as well as form a pool of gel 160 just below the surface 164. The pre-tilled earth will naturally provide open areas for the gel to fill. This configuration allows the gel to be adapted to accommodate the natural growth patterns of the roots.

An alternative method of insertion utilizes hydraulic rather than mechanical methods to insert the gel plug and seed. Instead of tines, sensors connected to a computer feed it the information to automatically adjust seed spacing according to the ground speed of the planting apparatus, and depth of injection determined by said soil moisture sensors.

Figure 7:
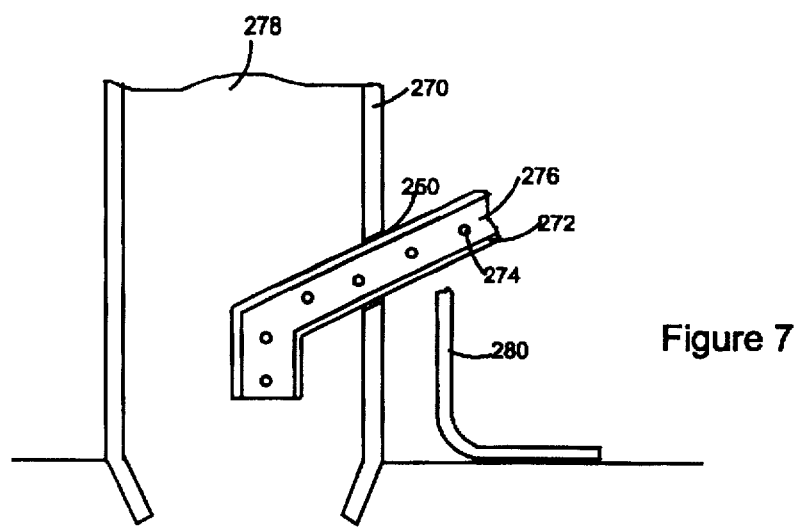
FIG. 7 is an exploded, cut-away side view of the liquid drill injector of the instant invention.

FIG. 7 illustrates one method of injecting the seed and gel combination into the soil. The injection nozzle 270 is provided with a entry channel 250 which allows for the seed insertion by means of seed nozzle 272. The seed 274 is suspended in a gel 276 which is pulsed into the main stream of gel 278 being injected through nozzle 270. The seeds 274 within the gel 276 have been dispersed at a distance which allows for sufficient carrier gel 276 to be dispensed. The end of the nozzle 272 must be a sufficient distance from the entry channel 250 to prevent any vacuum or cavitation from forming during the pulsing cycle. This method allows for the injection of the seed 274 to be timed to place the seed at the top of the plug of gel 278. A shoe skid 280 is used to smooth the earth over the point of injection. The shoe skid 280, although shown in this embodiment, can be used with any embodiment herein. The injection apparatus is preferably connected to the moisture monitor which provides information to the injector apparatus as to the quantity of gel required to reach the current level of the moisture horizon. This is one method of monitoring the amount of gel injected into the soil, as well as deposit the seed at the appropriate level, however other methods which are known in the art can also be used. The critical features are that the gel be deposited so as to come in contact with the moisture horizon, to allow for moisture wicking, and that the seed be deposited at the appropriate distance below ground level.

Figure 8:
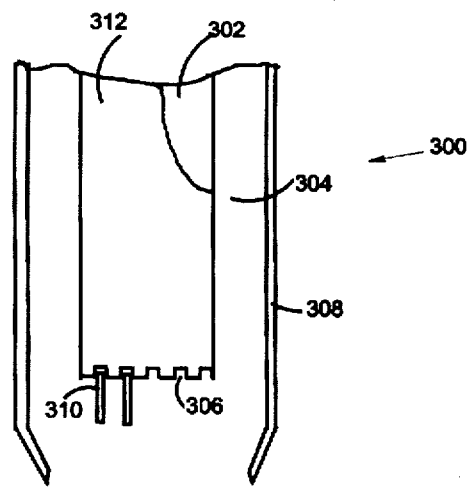
FIG. 8 is a injection system for the creation of microtubulars formed from gel-like material.

FIG. 8 illustrates an dual gel injection tube 300. The injection tube 300 is provided with an interior tube 312 which contains a gelatinous mixture which will not mix with the gel 304 contained in the outer injection tube 308. The interior tube 312 is provided with apertures 306, resembling a strainer, which allow for the gel to be extruded in a hollow form. The gel 304 has a more liquid consistency which allows it to flow more readily than the gel 302. As the gels 304 and 302 are designed not to mix, thereby maintaining individual integrity. In this way, the gel 302 forms capillaries 310 within the gel 304. The gel 302 is preferably a high waterbased mixture with hydrophillic additives, although other mixtures can be used, which will also serve to wick moisture up to the roots from the moisture horizon. Preferably the gel 304 forms a skin where it is not in contact with itself, thereby forming a skin between the gel plug and the earth, as well as between the gels 304 and 302.

Figure 9:
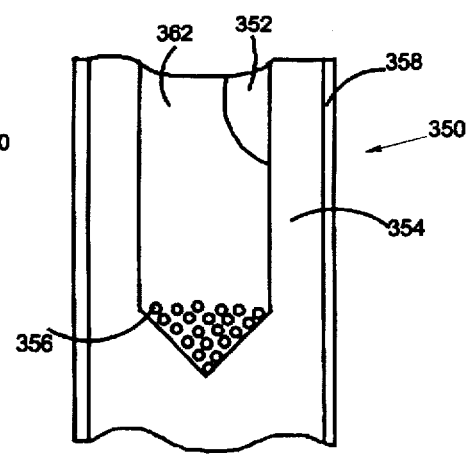
FIG. 9 is an exploded, cut-away side view of the injector for the formation of microtubulars using liquid or gas.

FIG. 9 illustrates a method of injecting a liquid or gas with the carrier gel 354 through use of liquid injection nozzle 350. The carrier gel 354 is ejected through the outer nozzle 358. Gas or liquid 352 is simultaneous ejected from interior tube 362 through apertures 356. As the gel 354 and liquid 352 are ejected capillaries are formed within the gel 354. The gel 354 must be a mixture which will not mix with the liquid or gas 352 to avoid the capillaries from collapsing.

The capillaries described herein are a hollow cylindrical shape, however, other configuration, such as helixical or woven shapes mechanically generated by spinnerets, or various geometrical configurations. The criteria being that whatever the configuration it must wick the moisture from the moisture horizon up to the plant root and/or seed.

The nozzles 300 and 350 are incorporated with the seed dispensing means as disclosed in FIG. 7 or other dispensing means known in the art. The critical feature of the nozzles 300 and 350 is providing capillaries to increasing the wicking capabilities of the gels. The capillaries allow for fluid to be drawn up to the plant root. There are various materials which can be used for this purpose and they will be apparent to those skilled in the art.

These figures represent only examples of directly inserting the gel into the soil and other methods will become apparent to those skilled in the art.

In some instances, the soil may be sufficiently dense, requiring such high force to penetrate to the moisture horizon, that damage to the seed would occur if the same pressure level was allowed to continue. Therefore, once the gel has been injected into the soil at the depth to reach the moisture horizon, the pressure would be lessened in order to prevent seed damage. This can be accomplished by mechanical means, such as pressure related valves, or electronically by microsensors. Alternatively, a two step process can be used which allows for a second injection nozzle to follow the first nozzle, injecting the seed just below the surface in the existing gel. In this way, the pressure applied to the seed is minimal, preventing seed damage. Specific care must be taken with the pre-treated, or pre-sprouted, seeds as they are more delicate than untreated seeds.

Figure 10:
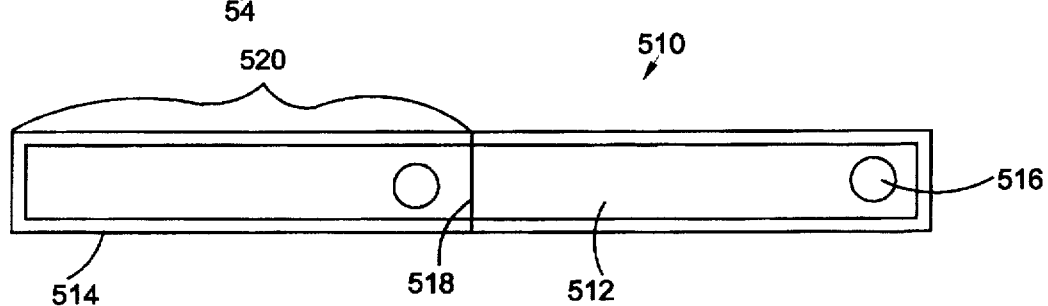
FIG. 10 is a side view of seed containing gel pellets.

The air generated self-sealing skin provides an one-step process which produces pellets. As illustrated in FIG. 10, the gel 512 can be extruded in tubes 510 with one seed 516 per predetermined length. Upon exposure to air the self-sealing skin 514 forms, allowing the tube to be transported and cut along cut-lines 518 into pellets 520. The pellets 520 can then be dropped into a pre-drilled hole in the soil. The pellets 520 do not provide the ease of automated broad acre planting as well as the system disclosed heretofore. The pellets 520 do, however, provide the advantage of allowing for smaller acreage planting or unautomated systems. The pellets 520 can be easily planted by hand, dropped into pre-done holes created by a tined roller. In U.S. Pat. No. 3,906,875 a Transplant Handling Means is disclosed. The device can handle seeds or plants and could easily be adapted for used with the pellets disclosed herein.

In order to provide for optimal use of the gel, the seeds can be genetically engineered to provide optimum adaptation to the gel formulation and configuration. Genetic engineering of seeds is no longer a rarity. Plants have been altered for resistance against pesticides, herbicides, as well as to produce a longer shelf life. The seeds used with the instant system can be altered to maximize the materials used in the gel as a food source.

The disclosed method allows the seed to develop a root system sufficient to reach the moisture horizon, which is usually closest to the soil surface at spring planting times. In some water-aggressive plants, such as dwarf-hybrid Mexican corn, the gel will allow development beyond the seed leaf stage of leaves without substantial addition of water simply by allowing for moisture to be drawn up the artificial root formed by the gel to the plant's roots. At the time of the first rainfall, the plant will have a substantial root capacity in place. If rainfall is scarce in a given year, this could make the difference between crop harvest or failure. Further, if a crop is seasonal and must have a precise number of days in its growing season to come to fruitation, the delay of seasonal rains by two or three weeks would be economically significant, perhaps disasterous. With the instant disclosure, plants already up, even if somewhat dormant, would be in a position to start growing again immediately and thus mature in their season.

The early root and stem development places weed competitors at a disadvantage as the food crop would have a head start. In some cases, mechanical weed suppression or herbicide application would be eliminated for a longer period, or fewer control attempts, which could directly bear on fuel and labor savings. Vast areas of farmable land are used only to support cattle because they receive rainfall in quantities too scarce to sustain broad acre farming on a predictable basis. Grain farmers typically need about two successful seasons out of every three years to stay in business. West of a line extending from central Texas into Canada, and reaching to the Rockie Mountains, millions of acres fall within this potential area of crop development. Four to six inches of additional rainfall, or its equivalent as provided by the artificial root system of this instant invention, would be sufficient to make broad acre cultivation profitable over much of this area.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A method of providing an artificial root system for promoting seed germination and growth, comprising the steps of:
    encasing a seed in a gel containing water and nutrients and capable of forming micro-tubular capillaries, said gel further containing a material to form a skin on said gel to isolate said gel from exterior elements;
    forming a plug from said gel, said plug having a first end and a second end;
    placing said plug into soil, said second end of said plug being proximate a moisture horizon,
    forming an artificial pathway for root growth along said plug;
    pulling moisture actively from said moisture horizon to said root;
    wherein as said seed germinates to form a plant, the roots of said plant extend along said gel to said moisture horizon and said micro-tubular capillaries wick water from said moisture horizon to draw additional water to said root.

2. The method of claim 1 further comprising the step of injecting said plug into said soil in a form consistent with natural root growth.

3. The method of claim 1 further comprising the step of positioning said seed within said plug a predetermined distance from said first end to provide optimal growth.

4. The method of claim 1 further comprising the step of increasing the active pull of moisture from said moisture horizon by adding a hydrophilic material to said gel.

5. The method of claim 1 further comprising the step of forming said micro-tubular capillaries from naturally occurring substances contained within said gel.

6. The method of claim 1 further comprising the step of artificially generating said micro-tubular capillaries added to said gel.

7. The method of claim 1 further comprising the step of protecting said plant from biological predation through the included of an agent within said gel, said agent being delivered to said root by said capillaries and absorbed by said root, said agent thereby becoming systemic within said plant.

8. The method of claim 1 further comprising the step of manipulating growth of said plant through the addition of genetic materials that are absorbed by said root thereby altering said plant growth patterns.

9. The method of claim 1 further comprising the step of enhancing the growth of said plant through the addition of beneficial organisms that are absorbed to enhance growth patterns of said plant.

10. The method of developing a proto-root system in a seed prior to natural rainfall by creating an artificial root path, comprising the steps of:
    preparing a gel capable of sustaining seed germination and initial root growth, said gel capable of forming micro-tubular capillaries;
    inserting said gel in the form of a plug into soil, said plug having a first end and a second end, to a depth sufficient to allow said second end to be in contact with a moisture horizon;
    creating a pathway for root growth between said moisture horizon and seed;

placing a seed within said plug at a distance from said first end of said plug based on optimal growth patterns for said seed;

actively wicking water along said micro-tubular capillaries from said moisture horizon to said seed;

facilitating growth of said root to said moisture horizon by providing minimum resistance along said gel;

wherein said gel provides an artificial root system to enable the rapid growth of said root by actively wicking water to said root and by providing a path for easy growth.

11. The method of planting a seed encased in a nutritional gel, comprising the steps of:

preparing a gel capable of sustaining plant life;

containing said gel within gel disposal means, said disposal means comprising an inner tube and an outer tube, said inner tube having at one end a plurality of openings;

containing seeds within seed injection means;

calculating periodically the depth of the moisture horizon through sensor means;

injecting said gel into soil to the depth of said moisture horizon and calculated by said sensor means;

injecting said seed from said seed injection means into said gel within said soil;

whereby one end of said gel is proximate the moisture horizon as based on the depth determined by said sensor means.

12. The method of planting a seed of claim 11 comprising the steps of placing a first gel in said inner tube and a second gel in said outer tube, said first gel having a different composition than said second gel, wherein under pressure said first gel forms capillaries within said second gel.

13. The method of planting a seed of claim 11 comprising the steps of placing a non-gelatinous material in an inner tube and a gel in an outer tube, said non-gelatinous material being composed so as to remain separate from the gel contained in said outer tube, wherein under pressure said non-gelatinous material forms capillaries within said gel.

* * * * *